United States Patent [19]

Proctor et al.

[11] Patent Number: 4,858,830
[45] Date of Patent: Aug. 22, 1989

[54] SPRAYING DEVICE HAVING AN ADDITIVE FLUID DISPENSER AT AN EXIT END

[75] Inventors: Rudy R. Proctor, Costa Mesa; Fred M. Reinstein, Encino, both of Calif.

[73] Assignee: Turbo Tek Enterprises, Inc., Los Angeles, Calif.

[21] Appl. No.: 77,836

[22] Filed: Jul. 27, 1987

Related U.S. Application Data

[63] Continuation-in-part of Ser. No. 45,562, May 4, 1987, abandoned, which is a continuation of Ser. No. 713,824, Mar. 20, 1985, Pat. No. 4,682,734.

[51] Int. Cl.$^4$ ................................. B05B 7/26
[52] U.S. Cl. ...................... 239/313; 239/315; 239/322; 239/397; 239/576
[58] Field of Search ........ 239/310, 313, 315, 320–322, 239/569, 576, 302, 589, 279, 281, 352, 357, 390, 391, 397; 222/133, 389

[56] References Cited

U.S. PATENT DOCUMENTS

| | | |
|---|---|---|
| D. 102,576 | 12/1936 | Ofeldt . |
| D. 155,508 | 10/1949 | Heimburger . |
| D. 230,641 | 3/1974 | Mowbray . |
| D. 243,532 | 3/1977 | Fyffe . |
| D. 270,560 | 9/1983 | Clivio et al. . |
| D. 283,832 | 5/1986 | Weinstein . |
| 1,030,119 | 6/1912 | Overbeke .................. 239/322 X |
| 1,117,228 | 11/1914 | Overbeke ........................ 239/313 |
| 1,169,524 | 1/1916 | Baker . |
| 2,215,375 | 9/1940 | Ortman . |
| 2,218,790 | 10/1940 | Gifford . |
| 2,257,585 | 9/1941 | Auvil . |
| 2,289,889 | 7/1942 | Stick et al. . |
| 2,337,149 | 12/1943 | Bullock . |
| 2,571,424 | 10/1951 | Dailey ............................ 239/313 X |
| 2,708,600 | 5/1955 | Froidevaux ..................... 239/322 X |
| 3,261,426 | 7/1966 | Kuhlman ........................ 239/322 X |
| 3,915,382 | 10/1975 | Davis . |
| 4,174,068 | 11/1979 | Rudolph . |
| 4,256,241 | 3/1981 | Mesic .............................. 239/309 X |
| 4,403,737 | 9/1983 | Hancock . |
| 4,682,734 | 11/1987 | Proctor et al. . |
| 4,767,059 | 8/1988 | Crapser et al. ................. 239/322 X |

FOREIGN PATENT DOCUMENTS

11951 of 1915 United Kingdom ................ 239/313

*Primary Examiner*—Andres Kashnikow
*Assistant Examiner*—Patrick N. Burkhart
*Attorney, Agent, or Firm*—Fleit, Jacobson Cohn, Price, Holman & Stern

[57] ABSTRACT

A spraying device comprising a spray tube having a fluid entrance end connectable to a primary fluid source, and a fluid exit end upon which an additive fluid dispenser is removably mounted. The additive fluid dispenser, having a chamber for holding additive fluid and a mixing chamber, is coupled to the fluid exit end of the spray tube in coaxial alignment with the direction of flow of primary fluid through the spray tube, causing opening of a valve mechanism in the fluid dispenser. The additive fluid then is metered into the primary fluid flowing through the dispenser, by diverting a portion of the primary fluid flow against a movable piston on a piston guide member-primary fluid conduit, to cause flow of the additive fluid through the valve mechanism. The spray tube may be of elongated telescoping construction, or of nontelescoping construction, and may include a control valve. The additive fluid dispenser preferably comes prefilled, is removably mounted on the spray tube by a quick-releasable connection, and is disposable.

41 Claims, 3 Drawing Sheets

SPRAYING DEVICE HAVING AN ADDITIVE FLUID DISPENSER AT AN EXIT END

This is a continuation-in-part of Ser. No. 045,562, filed May 4, 1987 now abandoned, which is a continuation of Ser. No. 713,824, filed Mar. 20, 1985 now U.S. Pat. No. 4,682,734.

BACKGROUND OF THE INVENTION

1. Field of the Invention

This invention relates generally to a spraying device in which primary and additive fluids are mixed internally and the resultant mixture is sprayed from the device. More specifically, the invention relates to a spraying device in the form of a hand-held spray tube which is provided with a control valve, wherein the spray tube may be of a telescoping construction which extends automatically in response to fluid pressure, and to a disposable additive fluid dispensing device which is adapted to be quick-releasably mounted on an exit end of the spray tube.

2. Description of Related Art

Spraying devices are known in which an additive fluid, such as detergent, insecticide or fertilizer, is mixed with a primary fluid, such as water, and the mixed fluids are then dispensed. For example, co-pending U.S. patent applications, Ser. No. 713,824 and Ser. No. 045,562, filed Mar. 20, 1985 and May 4, 1987, respectively, and assigned to the same assignee as the subject application, disclose a hand-held spraying device using a telescoping, wand-type spray tube, which dispenses mixed primary and additive fluids. In this device, the additive fluid (e.g., detergent) is stored in a refillable, flexible bladder in a housing of the device. As primary fluid (e.g., water) flows through the device, a portion of the primary fluid is selectively diverted to exert pressure on the bladder and cause the additive fluid to be dispensed into the primary fluid. The resultant mixture then sprays from the telescoping tube. While this device works well and has found wide commercial acceptance, a need also exists for a device in which the additive fluid comes prepackaged in an inexpensive, subsequently disposable form, and a primary purpose of this invention is to provide such a device.

U.S. Pat. No. 4,174,068 to R. L. Rudolph discloses an air gun having a disposable cartridge in which a part of the air entering the gun is diverted through a passage to cause a piston to force the cartridge material forward into the main air flow, which atomizes the material and causes it to spray out of the nozzle as a fine mist.

U.S. Pat. No. 4,403,737 to H. H. Hancock discloses a wand-type sprayer having an additive fluid jar mounted at its outer end, from which additive fluid is drawn by a primary fluid (e.g., water) through a connecting hose for mixture into the primary fluid as it sprays from the device.

U.S. Pat. No. 2,337,149 to G. E. Bullock discloses a wand-type spraying device comprising a cartridge chamber, an extension tube, a spraying device at an exit end of the extension tube and a control valve at an entrance end of the cartridge chamber. In use, water flows through the cartridge chamber to dissolve a cartridge therein and incorporate the material of the cartridge into the water, with the resultant mixture then flowing through the extension tube and out of the spray nozzle.

U.S. Pat. No. 2,218,790 to F. J. Gifford also discloses a spraying device of the wand-type comprising in sequence, a control valve, a cartridge chamber, an elongated extension tube and an outer spray nozzle.

U.S. Pat. No. 1,169,524 to L. S. Baker discloses a hand-carried spraying device comprising a container for holding a solution, an extension those and a spray nozzle, wherein water from an entrance hose produces hydraulic pressure on a movable piston in the solution container to cause the piston to apply pressure on the solution, thereby causing the solution to spray from the device through the spray nozzle.

U.S. Pat. No. 2,257,585 to G. Auvil discloses a spraying device having a telescopic handle extension wherein a releasable hand-gripping ferrule is selectively positionable along a tubular handle to vary the distance of a spray nozzle from the operator. The device also includes a control valve in the tubular handle.

U.S. Pat. No. 3,915,832 to J. C. Davis discloses a telescoping-type spray gun in which a spray nozzle is pivotally mounted at the outer end of a telescopic pole, with a hose connected to the spray nozzle and extending within the interior of the pole to a control valve at its inner end. When the pole is contracted excess hose is stored upon projecting lugs adjacent the inner end of the pole.

SUMMARY OF THE INVENTION

In general, a spraying device in accordance with the present invention comprises a spray tube having a fluid entrance end and a fluid exit end. The spray tube has a coupling mechanism for coupling the spray tube to a primary fluid source. An additive fluid dispenser, having a chamber for holding additive fluid, is coupled to the fluid exit end of the spray tube in coaxial alignment with the direction of the flow of primary fluid through the spray tube. The spray tube may be of elongated telescoping construction, or of nontelescoping construction, and may include a control valve. Preferably, the additive fluid dispenser comes as a prefilled cartridge, is removably mountable on the spray tube by a quick, releasable connection, and is disposable.

The additive fluid dispenser in accordance with the present invention comprises a housing assembly having an entrance end and a dispensing end, and a mechanism at the entrance end of the housing assembly for attaching the housing assembly to a source of primary fluid, such as the abovementioned spray tube. A conduit in the housing assembly carries the major portion of the flow of the primary fluid from the entrance end of the housing assembly to the dispensing end of the housing assembly. The housing assembly interior is divided into three chambers, with the first chamber, at the entrance end of the housing assembly, being for receiving a diverted portion of the primary fluid flow. The second chamber is for holding additive fluid, and the third chamber, adjacent the dispensing end of the housing assembly, is for mixing the primary and additive fluids. A releasable valve mechanism, which is opened by mounting the fluid dispenser onto the spray tube, precludes the flow of the additive fluid into the third mixing chamber prior to mounting the dispenser to the tube, and a movable member, preferably an annular piston, separates the primary fluid in the first chamber from the additive fluid in the second chamber. In use, the diverted portion of the primary fluid that flows into the first chamber moves the piston to produce pressure on the additive fluid and causes flow of the additive fluid from the second chamber, through the released valve mechanism, into the third chamber for mixing with the primary fluid. The mixed primary and additive fluids then flow out of the dispenser through a spray nozzle.

The housing assembly of the additive fluid dispenser may be comprised of an outer casing and a cap at the fluid entrance end of the housing assembly. The cap may be comprised of an outer clamping ring, an inner sealing ring, a mounting hub, and an opening in the mounting hub to allow the flow of primary fluid from the source of primary fluid into the conduit and the first chamber. The cap may be of a snap-on and self-sealing construction, with the cap and the casing including cooperating elements (including the cap sealing ring) for retaining and sealing the cap on the casing. The conduit may be a centrally disposed combination piston guide tube-primary fluid conduit having an annular flange adjacent a discharge end, which is located against a circumferential seat in the casing at the dispensing end of the housing assembly, and which cooperates with a flange-deflecting element of the casing to define the additive fluid releasable valve mechanism.

The elongated telescoping spray tube may comprise an outer tube having a coupling mechanism at a fluid entrance end of the outer tube, a control valve in the outer tube, and at least one additional inner tube reciprocally disposed in the outer tube for movement between extended and retracted positions. The inner tube also may be extendable outwardly relative to the outer tube in response to fluid pressure, with the additive fluid dispenser being coupled to the inner tube at the fluid exit end thereof.

DETAILED DESCRIPTION

Figure 1:
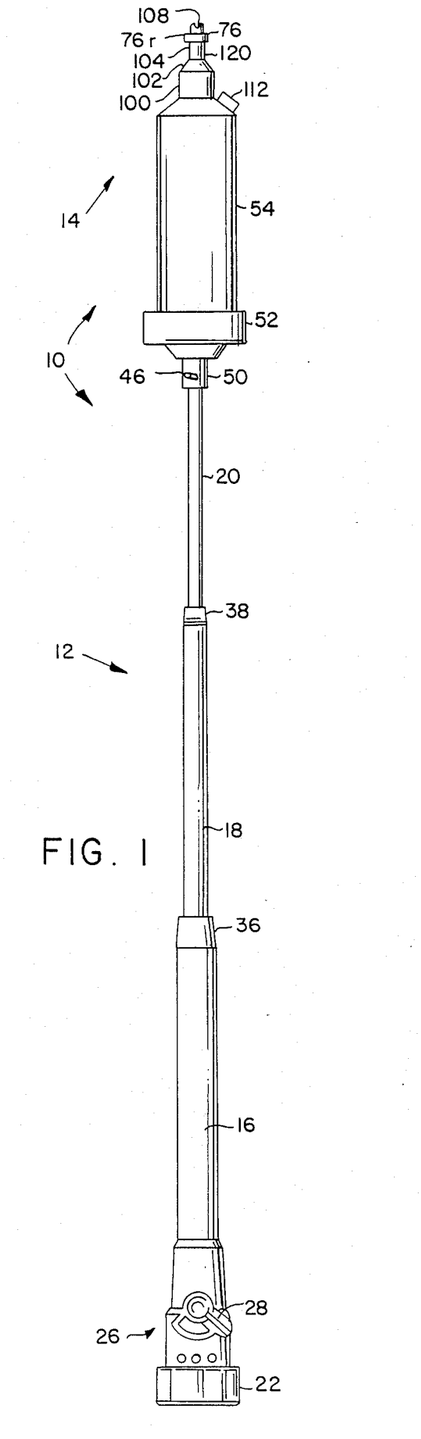
FIG. 1 is a plan view of a spraying device having an additive fluid dispenser and a telescoping spray tube in accordance with the invention, with the spray tube in an extended position.
Figure 2:
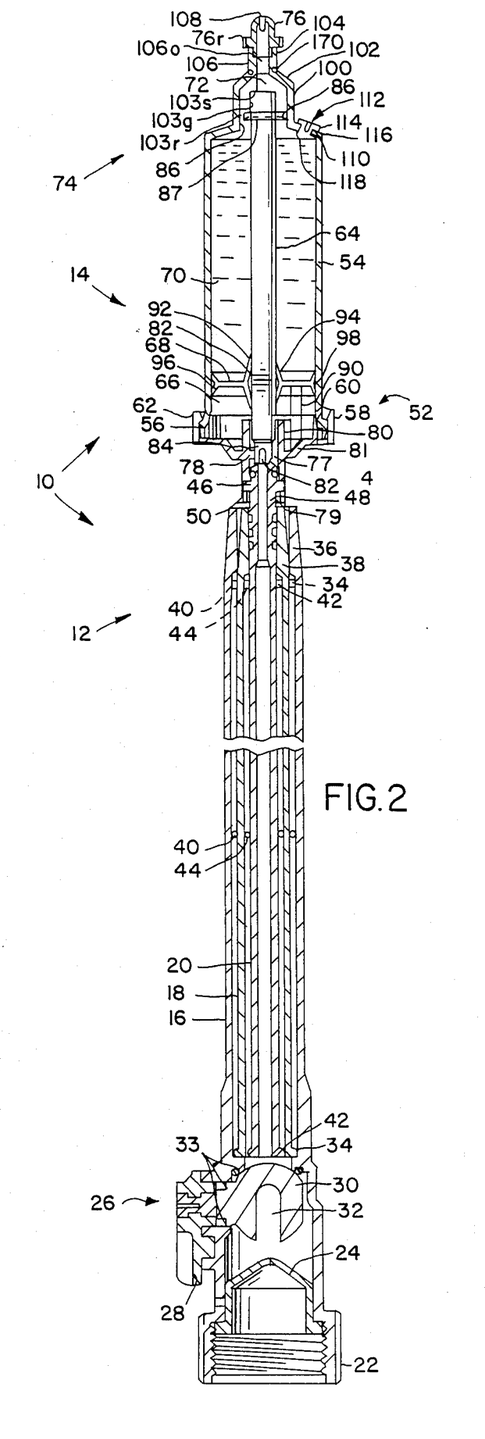
FIG. 2 is an enlarged cross-sectional view of the spraying device having the additive fluid dispenser and the telescoping spray tube as shown in FIG. 1, with the spray tube in a retracted position.

Referring to FIGS. 1 and 2, in the illustrated embodiment of the invention, a spraying device 10 comprises a spray tube in the form of a telescoping spray tube assembly 12, and a prepackaged additive fluid dispenser or cartridge 14 formed entirely of molded plastic parts. The additive fluid dispenser 14 is removably mounted on an exit end of the spray tube 12 as an extension thereof in coaxial alignment with a longitudinal axis of the spray tube, and thus in coaxial alignment with the direction of flow of a primary fluid (e.g., water) through the spray tube, to provide relatively unobstructed, high speed flow of the primary fluid through the dispenser. The telescoping spray tube 12 is constructed such that the spray tube automatically extends to an elongated operative position, as shown in FIG. 1, in response to pressure caused by the flow of the primary fluid through the spray tube. When a spraying operation is completed, the spray tube 12 may be manually collapsed to a retracted inoperative condition as shown in FIG. 2.

As disclosed herein, the telescoping spray tube 12 is of a type as shown in copending U.S. applications Ser. No. 713,824 and Ser. No. 045,562, the disclosures of which, to the extent not inconsistent with this disclosure, are hereby incorporated by reference. More specifically, the telescoping spray tube 12 comprises an outer plastic tube 16, an intermediate plastic tube 18, and an inner plastic tube 20 having, in accordance with the subject invention, the additive fluid dispenser 14 removably mountable at an outer end thereof.

The spray tube 12 is connectable to a source (e.g., a hose, not shown) of the primary fluid, such as water, by a screw threaded coupling 22 on an entrance end of the outer plastic tube 16. As is shown in FIG. 2, the primary fluid which enters the spray tube 12 initially passes through a one-way plastic check valve 24 of a suitable type for preventing reverse flow of the primary fluid in the tube. A ball valve 26, having an operating handle 28 and a ball 30 with a U-shaped passage 32, controls the primary fluid flow through the spray tube 12, with the valve having suitable O-rings 33 to prevent leakage, and at least an ON and an OFF position. When the valve 26 is in an OFF position, primary fluid is prevented from flowing through the spray tube 12 by the ball 30, and when the valve is in an ON position, the U-shaped passage 32 of the ball allows the primary fluid to flow therethrough and into the remainder of the spray tube.

With further reference to FIG. 2, an inner end of the intermediate tube 18 includes an annular flange 34 receivable in the outer tube 16 in closely spaced relationship, and an outer end portion 36 of the outer tube is of reduced diameter to limit outward telescoping movement of the intermediate tube when the spray tube 12 is in the extended position. As in the case of the outer tube 16, an outer end portion 38 of the intermediate tube 18 is of a reduced diameter to limit outward telescoping movement of the inner tube 20 therein when the spray tube 12 is in the extended position.

An O-ring seal 40 (FIG. 2) surrounds the intermediate tube and the outer tube 16. When the spray tube 12 is in its retracted collapsed condition, as shown in FIG. 2, the O-ring seal 40 normally is located approximately halfway between the intermediate tube flange 34 and the reduced end portion 36 of the outer tube 16, as shown in that figure.

As in the case of the intermediate tube 18, an inner end of the inner tube 20 also includes an annular flange 42 which is receivable in the intermediate tube in close spaced relationship. An O-ring seal 44, comparable to the O-ring seal 40, surrounds the inner tube 20 approximately halfway between the flange 42 and the reduced outer end portion 38 of the intermediate tube 18, when the spray tube 12 is in its retracted collapsed condition as shown in FIG. 2.

When the intermediate tube 18 and the inner tube 20 advance in a telescoping operation, the O-ring seals 40 and 44 tend to roll forward with the tubes to facilitate their advancement. As is illustrated by broken lines in FIG. 2, ultimately the O-ring seals 40 and 44 seat against the reduced diameter outer end portions 36 and 38 of the outer tube 16 and the intermediate tube 18, respectively, with the intermediate tube annular end flange 34 and the inner tube annular end flange 42 seating against their respective O-ring seals to limit outward movement of the tubes. Similarly, when the spray tube 12 is collapsed back to its retracted condition as described above, the O-ring seals 40 and 44 roll back to their intermediate positions as shown in solid lines in FIG. 2, to facilitate retraction of the tube members 18 and 20.

The prepackaged additive fluid dispenser 14 is removably mounted to the fluid exit end of the inner tube 20 of the telescoped spray tube 12 by projecting lugs 46 extending from a reduced end portion 48 of the inner tube. The projecting lugs 46 are received in respective right angle slots 50 (best shown in FIG. 3A) in a plastic cap 52 at a fluid entrance end of the additive fluid dispenser 14, and can be locked into position by turning.

The additive fluid dispenser 14 includes a housing comprised of a cylindrical outer plastic casing 54 and the cap 52. The cap 52 is of a snap-on and self-sealing construction, wherein the casing 54 and the cap include a cooperating mechanism for retaining and sealing the cap on the casing. More specifically, in assembly, an annular flange 56 on the casing 54 is inserted between a resilient outer clamping ring 58 and an inner sealing ring 60 of the cap, with the flange and sealing ring in tight sealing engagement, thus, eliminating the need for an O-ring to achieve the cap-casing sealing function. Inwardly directed clamping projections or lugs 62 on the outer clamping ring 58 of the cap 52 then engage over the annular flange 56 to retain the cap on the casing 54. For this purpose, the cap 52 includes arcuate slots 63 adjacent the lugs 62, left by molding members during molding of the lugs 62.

Figure 3A:
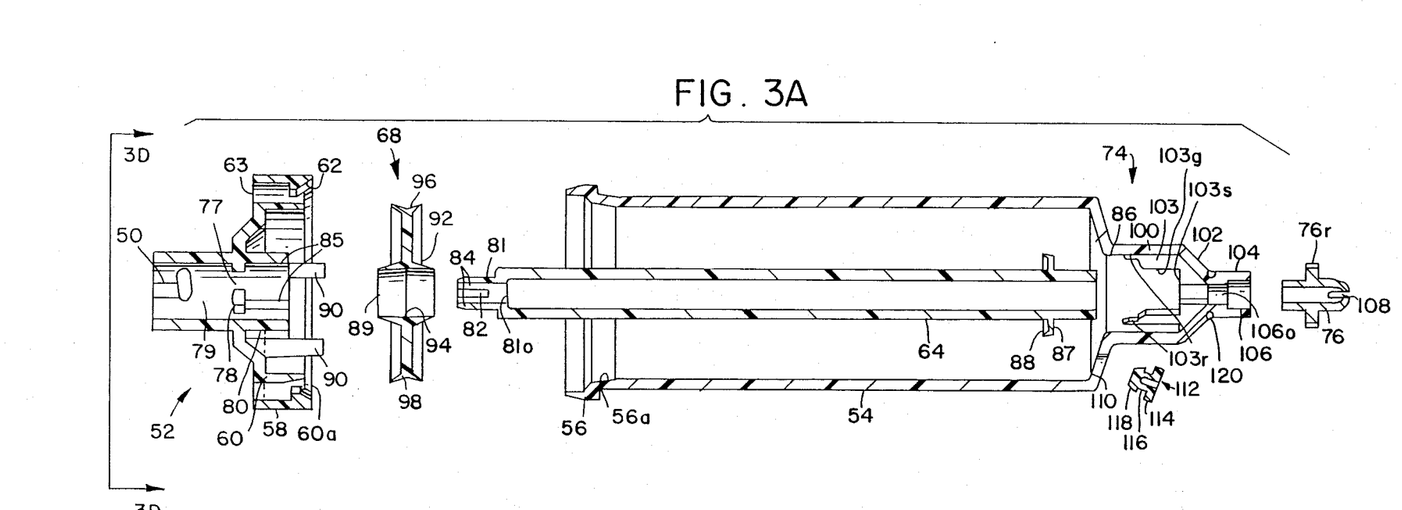
FIG. 3A is an exploded view of the additive fluid dispenser.

Referring to FIGS. 3A, the sealing of the cap 52 to the casing 54 is accomplished by mating surfaces 60a and 56a on the cap sealing ring 60 and the casing flange 56, respectively. For this purpose, the surfaces 60a and 56a are formed at the same angles of inclination to the longitudinal axis of the fluid dispenser 14, such as on the order of 10°. Thus, when the lugs 62 engage over the flange 56 as shown in FIG. 2, the surfaces 60a and 56a mate in tight-fitting engagement to form a fluid-tight seal therebetween.

An inner combination piston guide tube-primary fluid conduit 64 of plastic material is centrally disposed in the additive fluid dispenser 14 so that primary fluid enters the guide tube-primary fluid conduit from the reduced end portion 48 of the inner tube 20 of the telescoping spray tube 12. In use, a portion of the primary fluid is diverted and flows into a primary fluid pressure chamber 66 of the housing, to exert pressure on an annular plastic piston 68 separating the pressure chamber 66 from a second chamber 70 of the housing which has been prefilled with an additive fluid. The main portion of the primary fluid, however, flows through the combination guide tube-conduit 64 to a third mixing chamber 72 adjacent the exit of the housing, As a result of the diverted primary fluid flowing into the chamber 66, the piston 68 moves along the combination guide tube-conduit 64 and exerts pressure on the additive fluid in the chamber 70, which causes controllable flow of the additive fluid through releasable valve mechanism 74, at a slowly metered rate into the mixing chamber 72. The primary and additive fluids then are mixed in the mixing chamber 72 and dispensed through a nozzle 76 mounted in the casing 54.

Figure 3B:
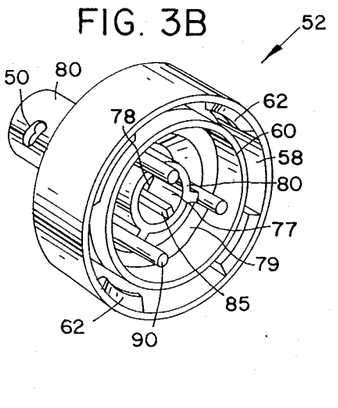
FIG. 3B is a perspective view of a snap-on and self-sealing cap for the additive fluid dispenser shown in FIG. 3A.
Figure 3C:
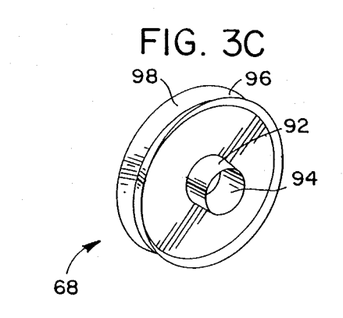
FIG. 3C is a perspective view of a self-sealing piston for the additive fluid dispenser shown in FIG. 3A.

The diverted portion of the primary fluid flows into the pressure chamber 66 through small passageways 77 (best shown in FIGS. 3A, 3B and 3D) defined in part by a plurality of circumferentially spaced, inwardly directed locating lugs 78 in a bore 79 of a central hub 80 of the cap 52. The lugs 78 define a socket which receives an end portion 81 of the combination piston guide tube-primary fluid conduit 64 of reduced diameter, which further defines the abovementioned passageways 77. The reduced end portion 81 also has an opening 81o of reduced internal diameter dependent on the viscosity of the additive fluid (e.g., 0.110" for car wax), which creates back pressure in the cap 52, to enhance the diversion of the primary fluid. Further, the reduced end portion 81 is provided with a transverse slot 82 which separates it into two resilient fingers 84 having rounded ends so that when the reduced end portion is received in the socket defined by the lugs 78 of the central hub 80, the fingers flex toward one another to be securely received between the lugs. The central hub 80 also includes inwardly directed locating lugs 85 which receive the larger diameter portion of the combination guide tube-conduit 64 in close-fitting relationship, with the lugs and the guide tube-conduit defining continuations of the passageways 77 leading to the pressure chamber 66.

Figure 3D:
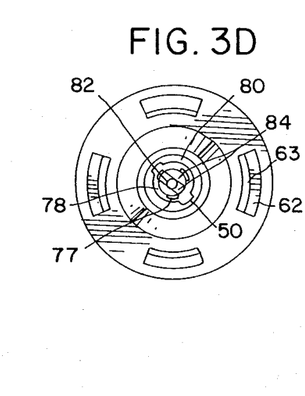
FIG. 3D is an end view of the fluid dispenser, in an assembled condition, as seen along the line 3D—3D in FIG. 3A.

When the additive fluid dispenser 14 is mounted on the spray tube 12 as shown in FIGS. 1 and 2, the discharge end of the spray tube engages firmly against the adjacent end of the reduced end portion 81 of the piston guide tube-primary fluid conduit 64. Accordingly, as is best shown in FIG. 3D, a primary function of the transverse slot 82 in the reduced end portion 81 is to divert a portion of the primary fluid from the discharge end of the spray tube 12 to the passageways 77 leading to the pressure chamber 66. More specifically, as the primary fluid flows from the discharge end of the spray tube 12, part of the fluid flows radially outward through the slot 82, then circumferentially around the reduced end portion 81, and finally through the passageways 77 into the pressure chamber 66.

Figure 3E:
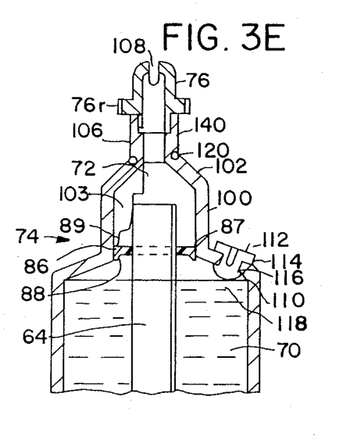
FIG. 3E is an enlarged, partial cross-sectional view of the dispensing end of the assembled additive fluid dispenser, prior to the dispenser being mounted on the spray tube.

The valve mechanism 74 comprises a valve seat portion 86 formed by a circumferential inner surface portion of the casing 54, and an annular valve flange 87 formed adjacent the exit end of the combination guide tube-conduit 64. As is illustrated in FIG. 3E, prior to the prefilled additive fluid dispenser 14 being mounted on the spray tube 12 for a spraying operation, a slightly rounded circumferentially extending resilient sealing lip 88 of the valve flange 87 engages firmly against the valve seat 86 to retain the additive fluid in the chamber 70. Then, when the additive fluid dispenser 14 is mounted on the discharge end of the spray tube 12 as above described and as shown in FIGS. 1 and 2, the discharge end of the spray tube pushes the combination guide tube-conduit 64 longitudinally toward the discharge end of the fluid dispenser 14 so that the valve flange 87 rides onto one or more small (e.g., 0.015" thick for car wax) ramps 103r (only one shown in FIG. 3E)

on the inner surface of the casing 54, and become deflected by the ramp(s) to create small openings between the inner casing and the valve flange. The pressure created in the chamber 70 by the diverted primary fluid and the piston 68, then causes a small flow of the additive fluid between the inner surface of the casing 54 and the deflected valve flange 87 into the mixing chamber 72. The rate of flow of the additive fluid can be varied, depending on the viscosity thereof, by modifying the thickness (inward projection) of the ramp(s) 103r and the pressure in the additive fluid chamber 70. Further, while in FIG. 3A a plurality of the ramps 103r are shown for purposes of illustration, best results in controlling the flow of the additive fluid normally are achieved when only one ramp is used.

The self-sealing piston 68 initially is seated against projecting posts 90 of the cap member 52, which insure that the piston is disposed in a cylindrical portion of the casing 54 in sealing engagement therewith, is of one-piece plastic construction, and is provided with a central bore 89 for receiving the combination guide tube-conduit 64 with a sliding fit. An inner wall of the central bore 89 is defined in part by a central portion of the piston 68 and in part by tapered hub portions 92 projecting from opposite sides of the central portion. More specifically, the inner wall of the central bore 89, in cross section, is in the shape of an internal annular groove 94 having a central apex and wall portions which taper in opposite directions radially inward from the apex toward a central axis of the piston 68. Thus, the tapered hub portions 92 define outer end portions which are resilient in nature and define seals for preventing leakage between the chambers 66 and 70 along the combination guide tube-conduit 64.

Similarly, the one-piece piston 68 has a periphery defined by annular groove 96 having a central apex and outwardly tapering wall portions 98. Thus, the tapering wall portions 98 also are resilient in nature and define seals for precluding leakable between the chambers 66 and 70 along an inner wall of the outer casing 54.

The mixing chamber 72 is defined by a reduced-diameter cylindrical portion 100, and a frustoconical portion 102, of the outer casing 54. The mixing chamber 72 is provided with a plurality (e.g., three) of inwardly extending, circumferentially spaced guide-stop ribs 103, which also facilitate the primary-additive fluid mixing function. More specifically, the guide-stop ribs 103 include guide surfaces 103g for receiving the combination guide tube-conduit 64 therebetween, and stop surfaces 103s for limiting the longitudinal movement of the combination guide tube-conduit 64 by the discharge end of the spray tube 12 when the fluid dispenser 14 is mounted thereon. The valve flange deflecting ramp(s) 103r also are formed as integral extensions of the ribs 103, as shown in FIGS. 2 and 3A. The frustoconical portion 102 of the mixing chamber 72 merges into a casing cylindrical tip portion 104, which has an internal annular flange 106 with a small (e.g., 0.100") orifice 106o therethrough for accelerating the velocity at which the mixed fluids exit from the mixing chamber 72 to the nozzle 76. The orifice 106o also cooperates with the opening 81o in the reduced end portion 81 of the combination guide tube-conduit 64 to create back pressure at the entrance end of the fluid dispenser 14, for diverting primary fluid into the pressure chamber 66.

The nozzle 76, which may be of any suitable configuration depending upon the type of spray desired, is disclosed in FIGS. 2 and 3A as being a small cylindrical plastic sleeve having a rounded outer end provided with a cross slot 108 to provide the desired type of spray. The nozzle 76 is press-fitted and/or suitably bonded in the outer end of the casing cylindrical tip portion 104 against the internal annular flange 106. In the alternative, the outer end of the casing tip portion 104 may be made of rounded construction and provided with a cross slot 108, in a manner not shown, to produce a nozzle 76 as an integral part of the casing 54. Further, where the nozzle 76 is press-fitted into the outer end of the casing cylindrical tip portion 104, and the nozzle is not suitable for a particular use, such as washing second story windows from the ground, the nozzle can be suitably removed from the tip portion by prying or gripping serrated ribs 76r on its periphery, and the internal orifice 106o can be used to produce a jet stream-type discharge for that purpose.

With the piston 68 seated on the projecting posts 90 of the cap member 52, prefilling of the housing with additive fluid is accomplished through a filling hole 110 in an outer end wall of the casing 54. The hole 110 then is sealed with a small plastic plug 112 having an annular outer bearing shoulder 114, an annular mounting groove 116 and an inner resilient annular retaining rib 118 which permits removal of the plug 112 as desired.

The additive fluid dispenser 14, being formed entirely of molded plastic, is advantageous because it is relatively easy to manufacture and assemble, and is relatively inexpensive. Thus, after all of the additive fluid has been expended from the dispenser 14, the dispenser may be removed and replaced with another prefilled dispenser, and the empty dispenser discarded.

Figure 4A:
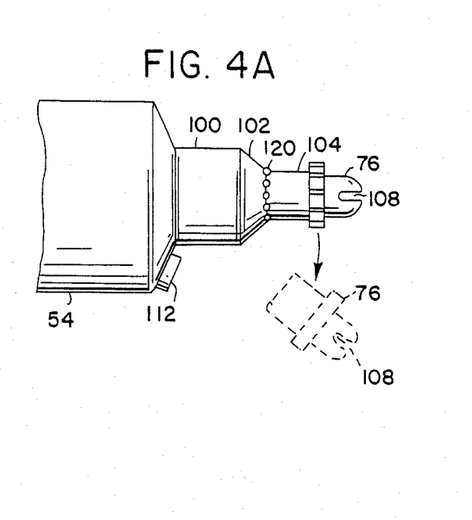
FIGS. 4A and 4B are partial views illustrating a feature of the additive fluid dispenser.
Figure 4B:
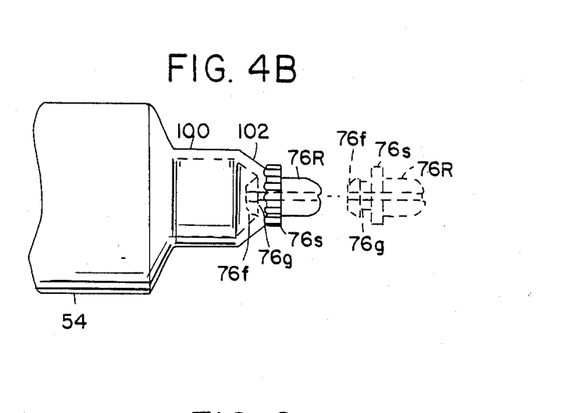

Referring to FIGS. 4A and 4B, an annular connection of the casing frustoconical portion 102 and the outer cylindrical tip portion 104 is provided with a series of circumferentially spaced indentations 120 (or a circumferential groove) to define a rupture or score line. Thus, where the initially provided spray nozzle 76 is not suitable for an intended purpose, the outer cylindrical tip portion 104 may be broken off along the rupture or score line, as indicated by dashed lines in FIG. 4A, and discarded. A replacement nozzle 76R (FIG. 4B) of the desired configuration then can be pressed or otherwise suitably secured (e.g., by bonding) into a thus exposed opening in the frustoconical portion 103. For example, the nozzle 76R may be of a press-in type which includes an annular outer bearing shoulder 76s, an annular mounting groove 76g and an inner resilient annular retaining flange 76f having a tapered lead-in surface.

Figure 5:
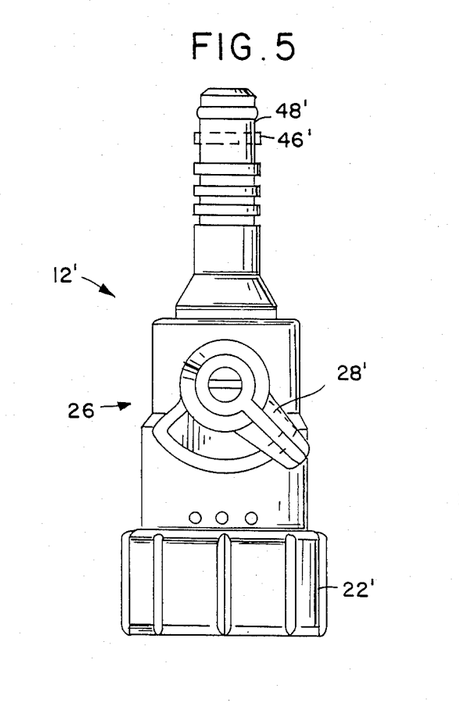
FIG. 5 is a plan view of an alternate embodiment of a spray tube in accordance with the invention.
Figure 6:
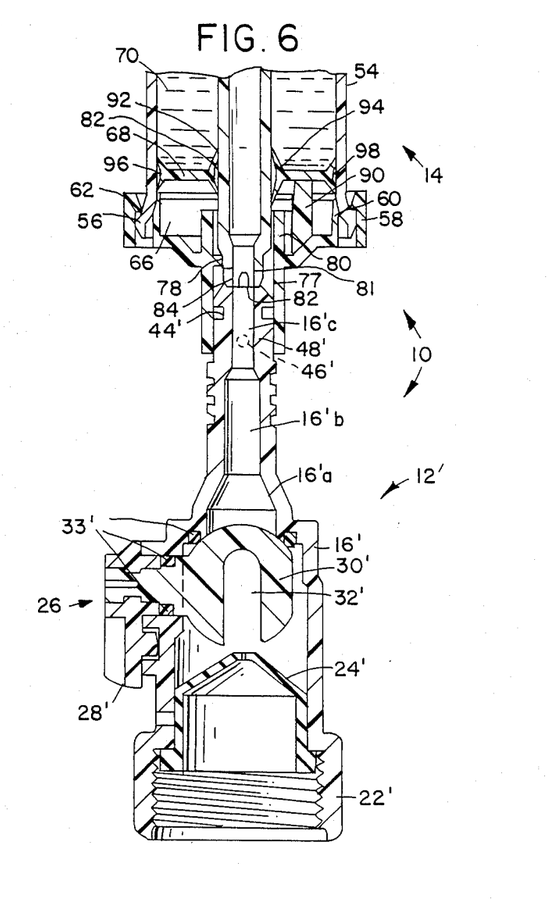
FIG. 6 is a cross-sectional view of the spray tube shown in FIG. 5 connected to the additive fluid dispenser shown in FIG. 3A.

Referring to FIGS. 5 and 6, a spraying device 10' comprising a nontelescoping spray tube assembly 12' is shown. In the spray tube assembly 12', as in the spray tube assembly 12 shown in FIGS. 1-4, primary fluid enters a tube 16' of the spray tube assembly 12' through a screw threaded coupling 22' and then passes through a one-way check valve 24' to a ball valve 26'. The ball valve 26' has an operating handle 28' and a ball 30' with a U-shaped passage 32' for controlling the fluid flow through the spray tube assembly 12', with the valve having at least an ON and an OFF position.

When in the OFF position, primary fluid is prevented from flowing through the spray tube assembly 12' by the ball 30'. When in the ON position, the ball 30' allows primary fluid to flow therethrough into a series of successively narrowing passageway portions 16'a, 16'b and 16'c. Seals in the form of O-rings 33' prevent the leakage of primary flow from the spray tube assembly 12'. The primary fluid flows from the passageway end portion 16'c into an additive fluid dispenser 14 of the same construction as shown in FIGS. 1-4 and removably mounted to the spray tube 12' by projecting lugs 46' which extend from an outside surface of a reduced passageway end portion 48'.

In summary, a new and improved spraying device 10 or 10', comprising a telescoping (FIGS. 1-4) or nontelescoping (FIGS. 5 and 6) spray tube assembly 12 or 12', and a prepackaged additive fluid dispensing device 14 which is adapted to be quick-releasably mounted on an exit end of either spray tube assembly, has been disclosed. The additive fluid dispenser 14 automatically meters the additive fluid into the primary fluid flowing through the spraying device 10 or 10', in response to the diversion of a portion of the primary fluid. The additive fluid dispenser 14 also causes internal mixing of the fluids and then discharges the mixture from the spraying device 10 or 10'. Further, the additive fluid dispenser 14 is advantageous in that it is lightweight, thus facilitating its being mounted on the exit end of the spray tube assembly 12 or 12', comes prefilled and can be quick-releasably mounted, making it easy to use, and is inexpensive to manufacture, so that it can be discharged after use.

What is claimed is:

1. A spraying device comprising:
   a spray tube having a fluid entrance end and a fluid exit end;
   coupling means for attaching the fluid entrance end of the spray tube to a primary fluid source;
   an additive fluid dispenser having a fluid entrance end and a fluid dispensing end, and having a chamber for holding additive fluid;
   cooperable means at the fluid exit end of the spray tube and the fluid entrance end of the additive fluid dispenser for removably coupling the fluid entrance end of the additive fluid dispenser to the fluid exit end of the spray tube in coaxial alignment with the direction of flow of primary fluid through the spray tube;
   releasable fluid sealing means in the additive fluid dispenser for retaining the additive fluid in the chamber of the additive fluid dispenser; and
   means in the additive fluid dispenser for releasing the releasable fluid sealing means to permit the additive fluid to flow from the chamber and the fluid dispensing end of the additive fluid dispenser, the releasable means including a member movable in the additive fluid dispenser to a releasing position in response to the coupling of the fluid entrance end of the additive fluid dispenser to the fluid exit end of the spray tube.

2. The spraying device as claimed in claim 1, further comprising a control valve in the spray tube between the coupling means and the fluid exit end of the spray tube, and having at least an ON and an OFF position.

3. The spraying device as claimed in claim 1, wherein the spray tube is an elongated, telescoping spray tube assembly comprising:
   an outer tube having the coupling means at a fluid entrance end of said tube, and
   at least one additional inner tube reciprocally disposed in the outer tube for movement between extended and retracted positions and extendable outwardly relative to the outer tube, the inner tube having the additive fluid dispenser coupled thereto at a fluid exit end of the inner tube.

4. The spraying device as claimed in claim 3, wherein the outer tube comprises a control vavle having at least an ON and an OFF position.

5. The spraying device as claimed in claim 3, wherein the inner tube includes means for automatically extending the inner tube in response to primary fluid pressure.

6. The spraying device as claimed in claim 1, wherein the additive fluid dispenser is removably mounted on the fluid exit end of the spray tube by a quick-releasable connection and the movable member for releasing the fluid sealing means extends through the additive fluid dispenser and also is a conduit for the primary fluid.

7. The spraying device as claimed in claim 6, wherein the quick-releasable connection includes projecting lugs on the fluid exit end of the spray tube recieved in respective right angle slots in the additive fluid dispenser.

8. A spraying device comprising:
   a spray tube having a fluid entrance end and a fluid exit end;
   coupling means for attaching the fluid entrance end of the spray tube to a primary fluid source;
   an additive fluid dispenser having a housing assembly which includes a fluid entrance end and a fluid dispensing end, and a chamber for holding additive fluid;
   cooperable means at the fluid exit end of the spray tube and the fluid entrance end of the housing assembly, for removably coupling the fluid entrance end of the housing assembly to the fluid exit end of the spray tube;
   releasable fluid sealing means in the housing assembly for retaining the additive fluid in the chamber of the housing assembly;
   means for releasing the releasable fluid sealing means to permit the additive fluid to flow from the chamber and the fluid dispensing end of the housing assembly, the releasable means being movable, at least in part, to a releasing position in response to the coupling of the fluid entrance end of the housing assembly to the fluid exit end of the spray tube;
   conduit means for carrying a flow of primary fluid from the spray tube attached at the fluid entrance end of the housing assembly, to the fluid dispensing end of the housing assembly;
   first chamber means in the housing assembly adjacent the fluid entrance end for receiving a diverted portion of the primary fluid flow;
   second chamber means in the housing assembly for holding the additive fluid;
   third chamber means in the housing assembly adjacent the fluid dispensing end for mixing of the primary and additive fluids, the releasable fluid sealing means precluding the flow of the additive fluid into the mixing chamber until released by the releasing means; and
   movable means for separating the diverted primary fluid in the first chamber means for the additive fluid in the second chamber means;
   said movable means being movable by the diverted portion of the primary fluid which flows into the first chamber means, to produce pressure on the additive fluid and cause flow of the additive fluid from the second chamber means into the third mixing chamber means.

9. The spraying device as claimed in claim 8, wherein the housing assembly of the additive fluid dispenser is comprised of an outer casing and a cap on the casing at the entrance end of the housing assembly.

10. The spraying device as claimed in claim 9, wherein the cap of the additive fluid dispenser is of a snap-on and self-sealing construction, and the cap and the casing include cooperating mating surfaces for retaining and sealing the cap on the casing.

11. The spraying device as claimed in claim 9, wherein the cap further comprises:
an outer clamping ring;
an inner sealing ring;
a mounting hub; and
an opening in the mounting hub to allow the flow of primary fluid to the conduit means and the first chamber means.

12. The spraying device as claimed in claim 11, wherein the movable means is a piston and the cap also includes projecting means defining a stop for the piston.

13. The spraying device as claimed in claim 8, further comprising a nozzle mounted at the dispensing end of the housing assembly of the additive fluid dispenser for dispensing the fluid flow out of the dispenser.

14. A spraying device as claimed in claim 13, wherein the dispensing end of the housing assembly includes a preformed rupture line so that the nozzle is replaceable by breaking off a portion of the housing assembly at the rupture line to form a new nozzle-receiving opening in the housing assembly, whereupon a different nozzle can be inserted into the thus-formed opening in the housing assembly;

15. The spraying device as claimed in claim 8, wherein the movable means for separating the primary fluid in the first chamber means of the additive fluid dispenser from the additive fluid in the second chamber means of the housing assembly of the additive fluid dispenser, is an annular piston.

16. The spraying device as claimed in claim 15, wherein the piston is of one-piece plastic construction and includes resilient tapered hub portions and peripheral tapered portions which define integral fluid seals.

17. The spraying device as claimed in claim 8, wherein the third mixing chamber means of the housing assembly of the additive fluid dispenser is formed by a reduced end portion of the housing assembly adjacent the dispensing end of the housing assembly.

18. The spraying device as claimed in claim 17 further comprising a further reduced portion at the dispensing end of the housing assembly of the additive fluid dispenser, and a spray nozzle mounted in the further reduced portion.

19. The spraying device as claimed in claim 18, wherein the nozzle is removable and the further reduced end portion includes a small internal orifice which produces a jet stream-type discharge upon removal of the nozzle.

20. The spraying device as claimed in claim 8, further comprising an opening with a snap-in plug in the housing assembly of the additive fluid dispenser adjacent its dispensing end, for filling the second chamber means with additive fluid.

21. An additive fluid dispenser, comprising:
a housing assembly having a fluid entrance end and a fluid dispensing end;
means at the fluid entrance end of the housing assembly for attaching the housing assembly to a source of primary fluid;
conduit means for carrying flow of primary fluid from the attaching means at the fluid entrance end of the housing assembly to the fluid dispensing end of the housing assembly;
first chamber means in the housing assembly adjacent the fluid entrance end for receiving a diverted portion of the primary fluid flow;
second chamber means in the housing assembly for holding an additive fluid;
third chamber means in the housing assembly adjacent the fluid dispensing end for mixing of the primary and additive fluids;
releasable sealing means for precluding flow of the additive fluid into the mixing chamber;
means for releasing said releasable sealing means, the releasing means being movable, at least in part, to a releasing position in response to the attaching of the additive fluid dispenser to the primary fluid source; and
movable means for separating the diverted primary fluid in the first chamber means for the additive fluid in the second chamber means;
said movable means being movable by the diverted portion of the primary fluid which flows into the first chamber means, to produce pressure on the additive fluid and cause flow of the additive fluid from the second chamber means into the third chamber means.

22. The additive fluid dispenser as claimed in claim 21, wherein the housing assembly is comprised of an outer casing and a cap on the casing at the entrance end of the housing assembly.

23. The additive fluid dispenser as claimed in claim 22, wherein the cap is of a snap-on and self-sealing construction, and the cap and the casing include cooperating mating surfaces for retaining and sealing the cap on the casing.

24. The additive fluid dispenser as claimed in claim 22, wherein the cap further comprises:
an outer clamping ring;
an inner sealing ring;
a mounting hub; and
an opening in the mounting hub to allow the flow of primary fluid to the conduit means and the first chamber means.

25. The additive fluid dispenser as claimed in claim 24, wherein the movable means is a piston and the cap includes projecting means defining a stop for the piston.

26. The additive fluid dispenser as claimed in claim 21, further comprising a nozzle mounted at the dispensing end of the housing assembly for dispensing the fluid flow out of the dispenser.

27. The additive fluid dispenser as claimed in claim 26, wherein the dispensing end of the housing assembly includes a preformed rupture line so that the nozzle is replaceable by breaking off a portion of the housing assembly to form a new nozzle-receiving opening in the housing assembly at the rupture line, whereupon a different nozzle can be inserted into the thus-formed opening in the housing assembly.

28. The additive fluid dispenser as claimed in claim 21, wherein the third mixing chamber means is formed by a reduced end portion of the housing assembly adjacent the dispensing end of the housing assembly.

29. The additive fluid dispenser as claimed in claim 28, further comprising a further reduced portion at the dispensing end of the housing assembly, and a spray nozzle mounted in the further reduced portion.

30. The additive fluid dispenser claimed in claim 29, wherein the nozzle is removable and the further reduced end portion includes a small internal orifice which produces a jet stream-type discharge upon removal of the nozzle.

31. The additive fluid dispenser as claimed in claim 28, wherein the reduced end portion of the housing assembly has a plurality of internal ribs for receiving the guide tube therebetween.

32. The additive fluid dispenser as claimed in claim 21, further comprising an opening wih a snap-in plug in the housing assembly adjacent its dispensing end, for filling the second chamber means with additive fluid.

33. A spraying device comprising:
a spray tube having a fluid entrance end and a fluid exit end;
coupling means for attaching the fluid entrance end of the spray tube to a primary fluid source;
an additive fluid dispenser for holding additive fluid and coupled to the fluid exit end of the spray tube in coaxial alignment with the direction of flow of primary fluid through the spray tube, the additive fluid dispenser comprising a housing assembly having an entrance end and a dispensing end;
coupling means at the entrance end of the housing assembly for attaching the entrance end of the housing assembly to the fluid exit end of the spray tube;
conduit means for carrying a flow of primary fluid from the spray tube attached at the entrance end of the housing assembly to the dispensing end of the housing assembly;
first chamber means in the housing assembly adjacent the entrance end for receiving a diverted portion of the primary fluid flow;
second chamber means in the housing assembly for holding the additive fluid;
third chamber means in the housing assembly adjacent the dispensing end for mixing of the primary and additive fluids;
releasable means for precluding flow of the additive fluid into the mixing chamber;
means for releasing said releasable means;
movable means for separating the diverted primary fluid in the first chamber means for the additive fluid in the second chamber means;
said movable means being movable by the diverted portion of the primary fluid which flows into the first chamber means, to produce pressure on the additive fluid and cause flow of the additive fluid from the second chamber means into the third mixing chamber means;
a centrally disposed guide tube forming part of the primary fluid conduit means through the housing assembly, the movable means being mounted for movement on the guide tube;
an annular valve flange on the guide tube adjacent a discharge end thereof, the flange forming part of the additive fluid releasable means;
a circumferential valve seat in the housing assembly adjacent the dispensing end of the housing assembly and engageable by the annular valve flange;
deflecting means adjacent the fluid dispensing end of the housing assembly for engaging and deflecting the valve flange out of sealing engagement with the valve seat; and
means for causing engagement of the valve flange and the deflecting means.

34. The spraying device as claimed in claim 33, wherein the means for engaging the valve flange and the deflecting means is the discharge end of the spray tube, which engages and causes longitudinal movement of the guide tube when the fluid dispenser is mounted on the spray tube.

35. The spraying device as claimed in claim 33, wherein:
the housing assembly of the additive fluid dispenser includes an outer casing and a cap on the casing at the entrance end of the housing assembly, the cap having a socket; and
the guide tube comprises resilient fingers integral with the guide tube and received in a flexed condition in the socket of the cap.

36. The spraying device as claimed in claim 33 wherein the dispensing end of the housing assembly has a plurality of internal ribs for receiving the guide tube between the ribs.

37. An additive fluid dispenser, comprising:
a housing assembly having an entrance end and a dispensing end;
means at the entrance end of the housing assembly for attaching the housing assembly to a source of primary fluid;
conduit means for carrying a flow of primary fluid from the attaching means at the entrance end of the housing assembly to the dispensing end of the housing assembly;
first chamber means in the housing assembly adjacent the entrance end for receiving a diverted portion of the primary fluid flow.
second chamber means in the housing assembly for holding an additive fluid;
third chamber means in the housing assembly adjacent the dispensing end for mixing of the primary and additive fluids;
releaseable means for precluding flow of the additive fluid into the mixing chamber;
means for releasing said releasable means;
movable means for separating the diverted primary fluid in the first chamber means for the additive fluid in the second chamber means;
said movable means being movable by the diverted portion of the primary fluid which flows into the first chamber means, to produce pressure on the additive fluid and cause flow of the additive fluid from the second chamber means into the third mixing chamber means;
a centrally disposed guide tube forming part of the primary fluid conduit means through the housing assembly, the movable means being mounted for movement of the guide tube;
an annular valve flange on the tube adjacent a discharge end thereof, the flange forming part of the additive fluid releasable means;
a circumferential valve seat in the housing assembly adjacent the dispensing end of the housing assembly and engageable by the annular valve flange;
deflecting means adjacent the fluid dispensing end of the housing assembly for engaging the deflecting the valve flange out of sealing engagement with the valve seat; and
means for causing engagement of the valve flange and the deflecting means.

38. The additive fluid dispenser as claimed in claim 37, wherein the means for engaging the valve flange and the deflecting means includes the guide tube, which is movable longitudinally by a discharge end of an associated spray tube, when the fluid dispenser is mounted on the spray tube.

39. The additive fluid dispenser as claimed in claim 37, wherein:
the housing assembly of the additive fluid dispenser includes an outer casing and a cap on the casing at the entrance end of the housing assembly, the cap having a socket; and
the guide tube comprises a resilient fingers integral with the guide tube and received in a flexed condition in the socket of the cap.

40. The additive fluid dispenser as claimed in claim 37, wherein the movable means for separating the primary fluid in the first chamber means for the additive fluid in the second chamber means is an annular piston.

41. The additive fluid dispenser as claimed in claim 40, wherein the piston is of one-piece plastic construction and includes resilient tapered hub portions ad peripheral tapered portions which define integral fluid seals.

* * * * *